United States Patent [19]
Hirota et al.

[11] Patent Number: 5,270,632
[45] Date of Patent: Dec. 14, 1993

[54] DRIVING SYSTEM FOR AN INDUCTION MOTOR HAVING A CIRCUIT FOR GENERATING A SLIP PULSE AND A PHASE SHIFTING PULSE

[75] Inventors: Mitsuhiko Hirota, Setagaya; Tadashi Inoue, Oshino, both of Japan

[73] Assignee: Fanuc Ltd, Minamitsuru, Japan

[21] Appl. No.: 855,704

[22] PCT Filed: Aug. 30, 1991

[86] PCT No.: PCT/JP91/01161
§ 371 Date: May 7, 1992
§ 102(e) Date: May 7, 1992

[87] PCT Pub. No.: WO92/04763
PCT Pub. Date: Mar. 19, 1992

[30] Foreign Application Priority Data
Sep. 7, 1990 [JP] Japan ............................... 2-235734

[51] Int. Cl.$^5$ .............................................. H02R 7/00
[52] U.S. Cl. .................................... 318/799; 318/811
[58] Field of Search ........................... 318/798–812, 318/52

[56] References Cited
U.S. PATENT DOCUMENTS

| | | | |
|---|---|---|---|
| 4,047,083 | 9/1977 | Plunkett | 318/807 |
| 4,259,628 | 3/1981 | Iwakane et al. | 318/799 |
| 4,266,176 | 5/1981 | Fulton | 318/801 |
| 4,321,518 | 3/1982 | Akamatsu | 318/810 X |
| 4,358,726 | 11/1982 | Iwakane et al. | 318/798 |
| 4,543,520 | 9/1985 | Danz et al. | 318/807 |
| 4,672,288 | 6/1987 | Abbondanti | 318/803 |
| 4,926,104 | 5/1990 | King et al. | 318/811 X |

FOREIGN PATENT DOCUMENTS 54-152120 11/1979 Japan.
55-74377 6/1980 Japan.
60-190181 9/1985 Japan.

*Primary Examiner*—Jonathan Wysocki
*Attorney, Agent, or Firm*—Staas & Halsey

[57] ABSTRACT

A driving system for an induction motor which is capable of properly controlling the speed of an induction motor over its high-speed revolution range and also features an excellent responsiveness to a speed command. In this system, a slip pulse (SSP) and a phase shifting pulse (FSP) are calculated by a slip pulse generator circuit (20) and a phase shifting pulse generator circuit (21) in accordance with slip pulse data (SB) and phase shifting pulse data (FB) which are calculated by a processor (1) in accordance with the speed command and an output of a speed detector. A counter (24) issues the first changeover signal (CS1) each time it receives a specified number of pulses from a pulse overlapping circuit (23). The first changeover signal corresponds to a feedback pulse calculated in accordance with the output of the speed detector and also to the slip pulse and the phase shifting pulse added. A square wave output circuit (26) generates square wave signals (Us through $\overline{W}s$) in accordance with the first changeover signal, the second changeover signal (CS2), which is obtained by delaying the first changeover signal, and rotational direction identifying signals (RS, $\overline{RS}$) received from the pulse overlapping circuit. While the motor is running at high speed, the drive of the motor is controlled in accordance with the square wave signals; while it is running at low speed, PWM signals (Up through $\overline{W}p$) generated by the processor are used in place of the square wave signals.

4 Claims, 9 Drawing Sheets

DRIVING SYSTEM FOR AN INDUCTION MOTOR HAVING A CIRCUIT FOR GENERATING A SLIP PULSE AND A PHASE SHIFTING PULSE

BACKGROUND OF THE INVENTION

1. Field of the Invention

The present invention relates to a driving system for variably controlling of the number revolutions per time of an induction motor, and more particularly, to a driving system featuring an excellent responsiveness to a speed command.

2. Description of the Related Art

It is well known that each switching device of an inverter which supplies the current for driving each phase of an induction motor is turned ON or OFF in accordance with a sinusoidal wave PWM driving signal generated in response to a speed command, thereby performing variable control of the revolution speed of the motor. It is known that, in the sinusoidal wave PWM driving method, the responsiveness to a speed command is improved by carrying out vector control which permits instantaneous torque control of a motor by controlling the phases of driving signals. However, there is limitation in the switching performance of the switching devices of the inverter. Thus, it is difficult for the sinusoidal PWM driving method to properly control a motor's speed when the motor is in operation at such a high-speed as 40,000 revolutions or more per minute.

It is also known to variably control the revolution speed of an induction motor with ON-OFF control of switching devices of an inverter, using a square-wave signal. According to the square-wave drive control method, a motor's speed can be properly controlled even in a high-speed revolution range of the motor. However, in the square-wave drive control method, the vector control, which permits the control of an instantaneous torque of a motor, cannot be performed; therefore, slip control is employed so that a slip frequency can be controlled according to a motor revolution speed and a speed deviation thereof from a speed command to permit control of the average torque of the motor. Thus, the square-wave drive control method is disadvantageous in that it has poor responsiveness to the speed command.

SUMMARY OF THE INVENTION

An object of the present invention is to provide a driving system for an induction motor, which is not only capable of proper speed control in a high-speed revolution area of the induction motor but also features an excellent responsiveness to speed commands.

To fulfill this object, the driving system for an induction motor in accordance with the present invention is equipped with an inverter which includes switching devices related to the individual phases of the motor, a detector for generating a pulse output which represents the actual revolution speed of the motor, and a circuit means which generates a slip pulse and a phase shifting pulse according to a speed command received from a host control unit and output pulses received from the detector, corrects the number of output pulses by using the slip pulse and phase shifting pulse, and generates a square wave signal used for controlling the switching operation of a switching device in accordance with the corrected output pulse.

Preferably, the circuit means has a circuit for generating PWM signals used for controlling the switching operation of the switching devices, and a selector circuit for selectively sending out either a square wave signal or a PWM signal. The selector circuit sends out the PWM signal when the revolution speed of a motor is a specified speed or less, whereas the selector circuit sends out the square wave signal when the revolution speed of the motor exceeds the specified speed.

Further, the circuit means preferably corrects the number of output pulses from the detector by a phase shifting pulse so that the exciting current of each phase of the motor and the secondary current, which are generated as a result of the switching operation of the switching device based on the square wave signal generated according to the corrected output pulses, intersect orthogonally with each other.

As described above, according to the driving system of the present invention, detector output pulses are corrected using a slip pulse and phase shifting pulse which are generated in accordance with a speed command and a detector pulse output indicating an actual motor speed, and the square wave signal is generated in accordance with the corrected detector output pulse. Thus, the slip and instantaneous torque of a motor can be controlled by controlling the switching operation of the switching devices of an inverter relating to the individual phases of the motor by using square wave signals, thereby improving the responsiveness to a speed command.

Preferably, the switching operation of a switching device is made controllable by PWM signals when the revolution speed of a motor is a specified speed or less so that the responsiveness in controlling the motor can be improved even for the case where the motor is to be operated at a low speed. The control using the square wave signals is made possible when the revolution speed of the motor exceeds the specified speed, so that proper control of the motor can be assured even during the high-speed operation of the motor when the control of the motor by the PWM-based driving method is difficult. Furthermore, the phase of the square wave signal can be controlled, so that the necessary responsiveness in motor control can be maintained even during high-speed operation of the motor. More preferable, instantaneous torque of a motor is properly controlled by making the exciting current of each phase of the motor and the secondary current, which are generated as a result of the switching operation of a switching device, intersect orthogonally with each other, where the switching operation is based on a square wave signal generated in accordance with a corrected output pulse from the detector.

DESCRIPTION OF THE PREFERRED EMBODIMENTS

Overall Configuration

Figure 1:
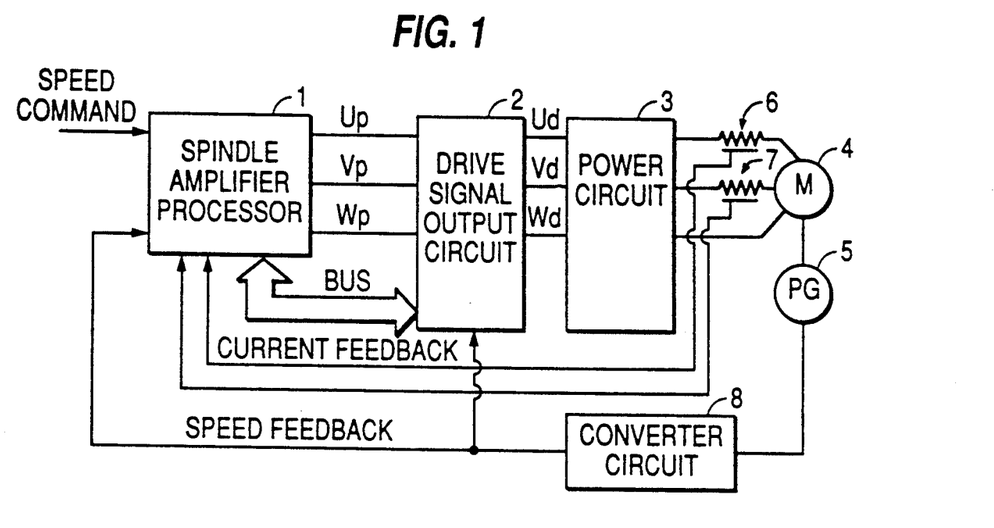
FIG. 1 is a block diagram showing a principal part of a driving system for a three-phase induction motor according to an embodiment of the present invention.

Referring to FIG. 1, a driving system according to an embodiment of the present invention is designed to control a three-phase induction motor 4, which is used as a spindle motor for a machine tool (not illustrated), and is equipped with a spindle amplifier processor 1. The processor 1 carries out conventional speed loop control and current control which are based on a speed command received from an NC unit (not illustrated) mounted on the machine tool and a speed feedback signal and current feedback signal received from elements 5 through 8, which will be discussed later in order to generate three-phase PWM signals Up, Vp, and Wp. The processor also supplies data SB to a slip pulse generator circuit (FIG. 2) in order to generate a pulse SSP (slip pulse) for increasing or decreasing an exciting frequency of the induction motor in accordance with the speed command and a speed deviation based on a speed feedback, and the data FB to a phase shifting pulse generator circuit (FIG. 2) in order to generate a pulse FSP for instantaneously shifting a phase with respect to one cycle (360 degrees) of an exciting frequency of the induction motor.

The driving system is equipped with a driving signal output circuit 2 for selectively issuing three-phase square wave signals Up, Vp, and Wp inputted through processor 1 or the three-phase square wave signals Ud, Vd and Wd generated internally in accordance with the three-phase PWM or both pulse data SB and FB received from the processor 1 and A-phase and B-phase speed feedback signals (FIG. 2) received from the element 8, which will discussed later. The driving system also is equipped with a power circuit 3 which comprises an inverter, and a drive circuit for driving the inverter and supplying driving currents to the motor 4 in accordance with a driving signal from the driving signal output circuit 2. The driving system is further equipped with a speed detector 5 for detecting an actual revolution speed of the motor 4, current detectors 6 and 7 for respectively detecting an actual U-phase driving current and V-phase driving current of the motor 4, and a converting circuit 8 for generating A-phase and B-phase speed feedback signals differing in phase by 90 degrees depending on the output from the speed detector 5.

Driving Signal Output Circuit

Figure 2:
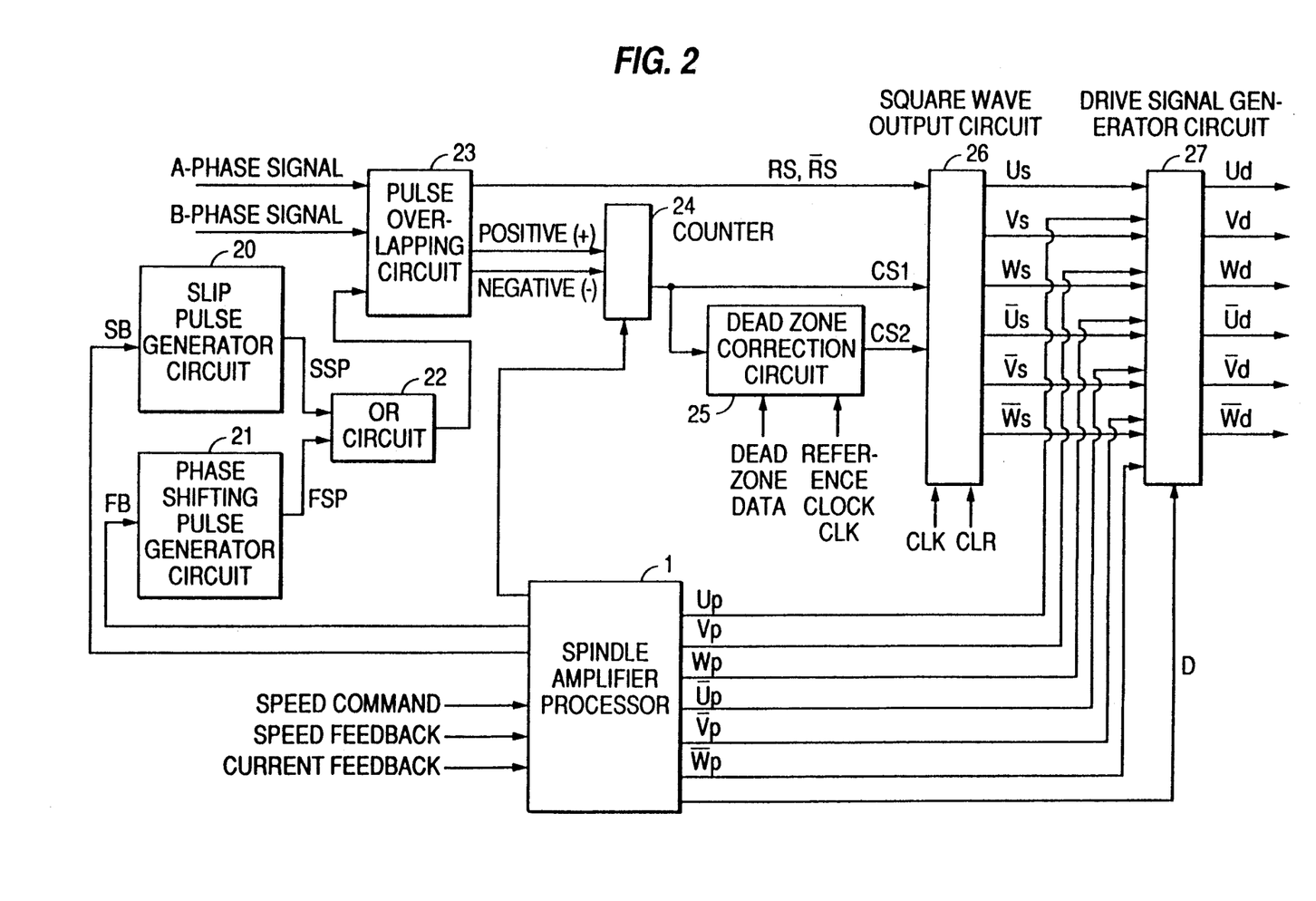
FIG. 2 is a block diagram showing a driving signal output circuit of FIG. 1.

Referring to FIG. 2, the driving signal output circuit 2 is equipped with a circuit 20 for generating the number of slip pulses corresponding to the slip pulse data SB from the processor 1, a circuit 21 for generating the number of phase shifting pulses corresponding to the phase shifting data FB received from the processor 1, and a logical sum (OR) circuit 22 connected to the two circuits, 20 and 21. A pulse overlapping circuit 23 of the driving signal output circuit 2 generates the first rotational direction identifying signal $\overline{RS}$, which changes to a low level or high level when the motor runs in the forward or reverse direction, and the second rotational direction identifying signal RS, which changes to a high level or low level when the motor runs in the forward or reverse direction, in accordance with the A-phase and B-phase speed feedback signals from the pulse converting circuit 8, and it also generates a forward- or reverse-direction feedback pulse according to the rotational direction of the motor. Further, the pulse overlapping circuit 23 is designed to add or subtract a slip pulse and a phase shifting pulse, which are supplied from the circuits 20 and 21, through the OR circuit 22, to or from the forward- or reverse-direction feedback pulse according to the rotational direction of the motor, thereby generating a forward-or reverse-direction pulse matching the rotational direction of the motor.

The driving signal output circuit 2 is further equipped with a counter 24, which counts the pulses received from the pulse overlapping circuit 23 and generates the first changeover signal CS1. Control data representing a specified number of pulses and relating to the changeover signal generating operation of the counter 24 can be set in the counter by the processor 1. For instance, in the case of the motor 4, the specified number of pulses corresponds to the rotary motion of the rotor (not shown) for an electric angle of 45 degrees. In this embodiment, any value out of "16", "32" or "64" can selectively be set as the specified number of pulses, whereby the system can be adapted to any of the three different motor-types which require 128, 256, and 512 pulses respectively for the rotor to turn for an electrical angle of 360 degrees. The counter 24 is designed to generate the first changeover signal CS1 each time the specified number of pulses are received from the pulse overlapping circuit 23. This means that the counter 24 works as a ring counter for counting the specified number of pulses; it counts up when the motor runs in the forward direction, whereas it counts down when the motor runs in the reverse direction.

To the output side of the counter 24 is connected a delay circuit (dead zone correcting circuit) 25 for generating the second changeover signal CS2 which is delayed from the first changeover signal CS1 by a specified time. The delay circuit 25 prevents the switching devices of the inverter belonging to exciting coils of an identical phase in the motor 4 from turning ON at the same time; it includes a counter (not shown) wherein delay time data (dead zone data) from the processor 1 is set, and also it is designed to generate the second changeover signal CS2 when a carry takes place in the counter value which increments each time a reference clock signal CLK is received from the processor 1 (see FIG. 8).

The driving signal output circuit 2 is further equipped with a square wave output circuit 26 for generating square wave signals Us, Vs, Ws, $\overline{Us}$, $\overline{Vs}$, and $\overline{Ws}$ for the individual phases in accordance with the first and second rotational directional identifying signals RS and $\overline{RS}$ from the pulse overlapping circuit 23; the first changeover signal CS1 from the counter 24; the second changeover signal CS2 from the delay circuit 25. In addition, the driving signal output circuit is equipped with a driving signal generator circuit 27 connected to the processor 1 and the square wave output circuit 26. The driving signal generator circuit 27 is designed to send out the PWM signals Up, Vp, Wp, $\overline{\text{Up}}$, $\overline{\text{Vp}}$, and $\overline{\text{Wp}}$ from the processor 1, or the square wave signals Us, Vs, Ws, $\overline{\text{Us}}$, $\overline{\text{Vs}}$, and $\overline{\text{Ws}}$ from the circuit 26, as driving signals Ud, Vd, Wd, $\overline{\text{Ud}}$, $\overline{\text{Vd}}$, and $\overline{\text{Wd}}$ in accordance with a selective signal D received from the processor 1.

Slip Pulse Generator Circuit

Figure 3:
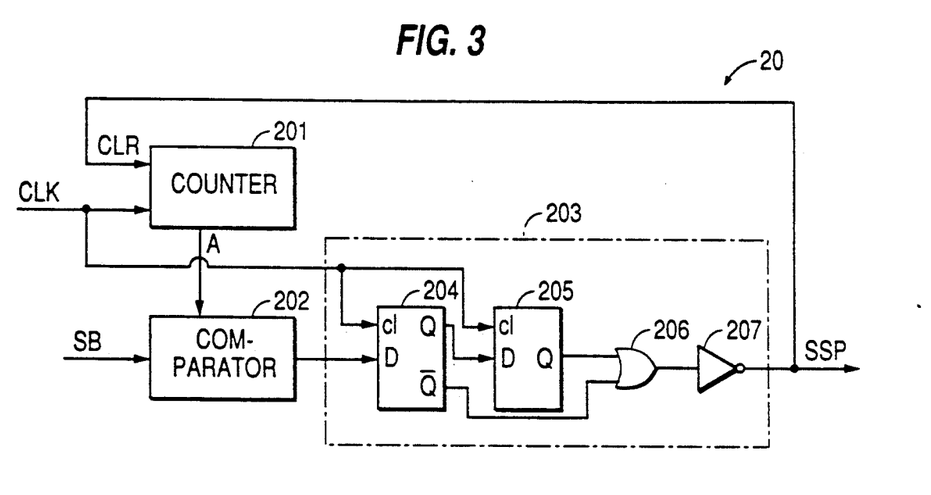
FIG. 3 is a block diagram showing a slip pulse generator circuit of FIG. 2.

As shown in FIG. 3, the slip pulse generator circuit 20 comprises a counter 201 for counting the reference clock signal CLK from the processor 1, a comparator 202 for comparing a count value A of the counter 201 with the slip pulse data SB from the processor 1, and a 1-pulse generator circuit 203. The comparator 202 is designed to generate a high-level output when the count value A of the counter 201 exceeds the slip pulse data SB.

The 1-pulse generator 203 comprises the first D-type flip-flop (FF) circuit 204 which has a clock input terminal c1 for receiving the reference clock signal CLK and a data input terminal D for receiving an output of the comparator 202, the second D-type FF circuit 205 which has a clock input terminal c1 for receiving the reference clock signal CLK and a data input terminal D for receiving a Q output of the first FF circuit 204, an OR circuit 206, whose two input terminals are connected to a $\overline{\text{Q}}$ output terminal of the first FF circuit 204 and the Q output terminal of the second FF circuit 205, and an inverter 207 connected to the output side of the OR circuit 206, whereas the output terminal of the inverter 207 is connected to a clear signal input terminal of the counter 201. Accordingly, as long as the output of the comparator 202 stays at the low level, the Q outputs of the first and second FF circuits 204 and 205 are both at the low level, whereas the output of the OR circuit 206 is high level, and the output of the inverter 207 is low level.

Figure 4:
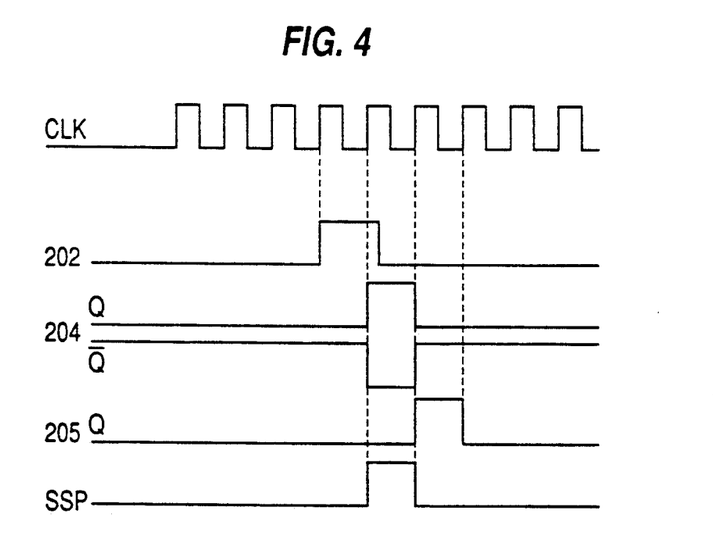
FIG. 4 is a timing chart showing the operation of the slip pulse generator circuit.

As shown in FIG. 4, if the reference clock signal CLK applied to the first FF circuit 204 rises immediately after a high-level output is issued from the comparator 202 because of the count value A of the counter 201 exceeding the slip pulse data SB, the $\overline{\text{Q}}$ output of the first FF circuit switches from the high level to the low level, whereas the Q output of the second FF circuit 205 stays at the low level. As a result, the output level of the OR circuit 206 becomes low, whereas the output level of the inverter 207 becomes high, and the high-level output of the inverter 207, as the slip pulse SSP, is applied to the clear signal input terminal of the counter 201, causing the counter value A to be reset to "0." When the next reference clock signal CLK rises, the $\overline{\text{Q}}$ output of the first FF circuit 204 switches from the low level to the high level, whereas the Q output of the second FF circuit 205 switches from the low level to the high level. As a result, the output level of the OR circuit 206 becomes high, while the output level of the inverter 207 becomes low, causing the slip pulse SSP to extinguish. Thus, the slip pulse SSP is generated whenever the count value A exceeds the slip pulse data SB.

Phase Shifting Pulse Generator Circuit

Figure 5:
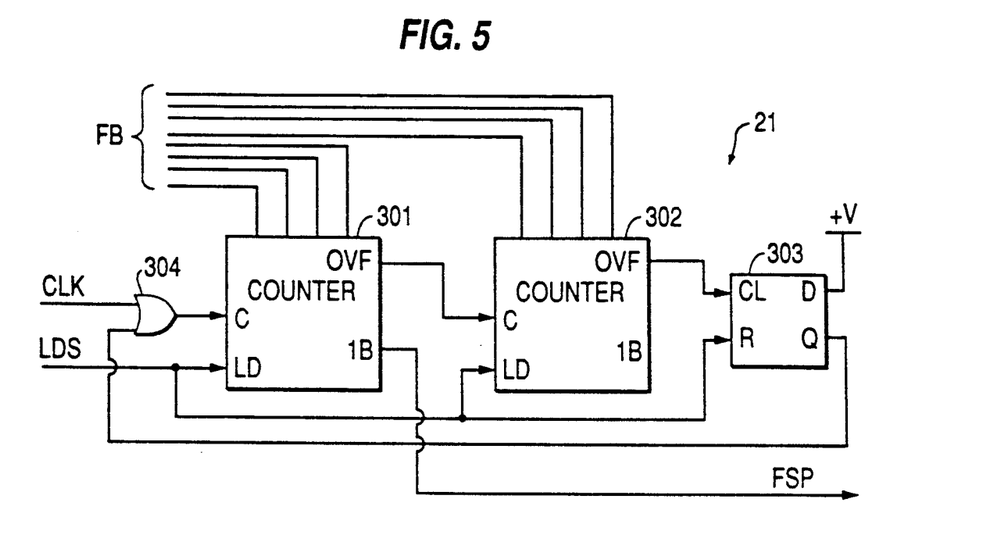
FIG. 5 is a block diagram showing a phase shifting pulse generator circuit of FIG. 2.

Referring to FIG. 5, the phase shifting pulse generator circuit 21 has the first and second counters 301 and 302, each of which comprises a 4-bit hexadecimal counter, a D-type FF circuit 303, and an OR circuit 304. Each of the first and second counters 301 and 302 has a load command input terminal LD for receiving a load command LDS from the processor 1. The first counter 301 has the first through fourth phase shifting data input terminals which respectively correspond to the first through fourth bits of 8-bit phase shifting data FB received from the processor 1, and the least significant bit output terminal 1B which functions as an output terminal for sending out a phase shifting pulse FSP of the phase shifting pulse generator circuit 21. The second counter 302 has the first through fourth phase shifting data input terminals, which respectively correspond to the fifth through eighth bits of the phase shifting data FB. The phase shifting data FB is equal to a complementary number (e.g., F6 (binary-coded decimal number)) of a value which is obtained by doubling a required number (e.g., 5) of the phase shifting pulse FSP sent out from the circuit 21.

Further, the first counter 301 has a clock input terminal C connected to the output terminal of the OR circuit 304, which has two input terminals connected to the reference clock signal output terminal of the processor 1 and the Q output terminal of the FF circuit 303 respectively, and an overflow output terminal OVF connected to the input terminal C of the second counter 302. The overflow output terminal OVF of the second counter 302 is connected to a clear signal input terminal CL of the FF circuit 303 which has a resetting terminal R for receiving the load command LDS from the processor 1 and the data input terminal D which is connected to a positive voltage source.

Figure 6:
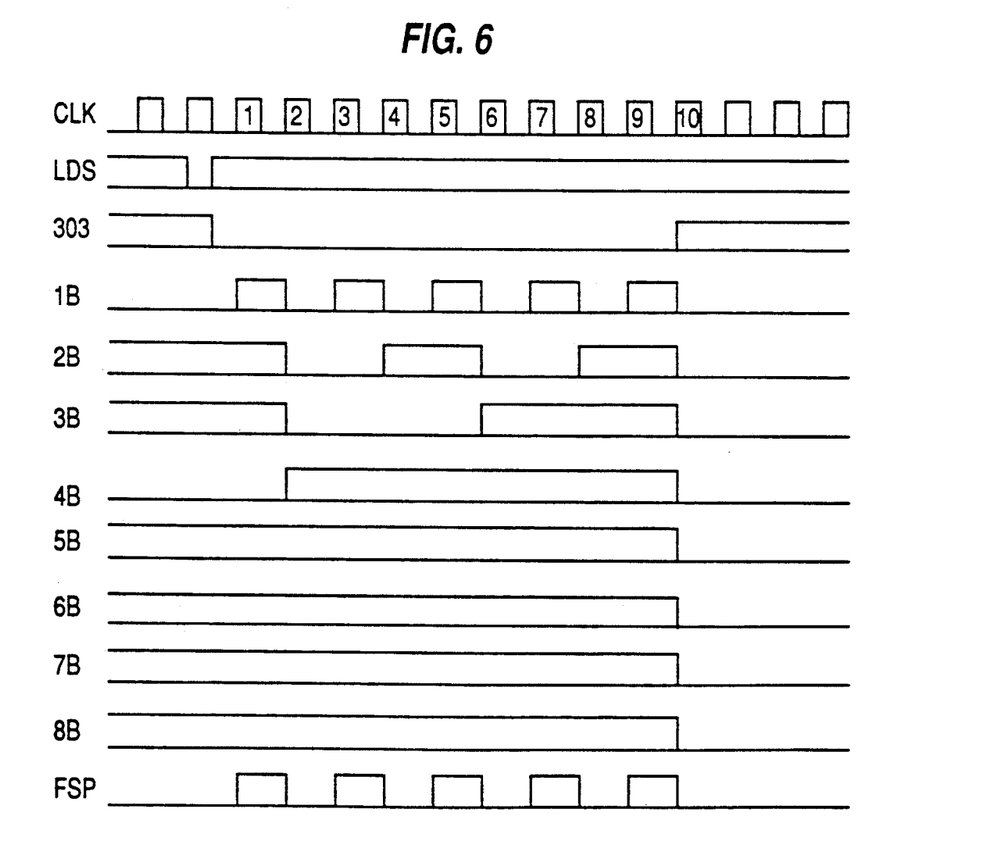
FIG. 6 is a timing chart showing the operation of the phase shifting pulse generator circuit.

The operation of the phase shifting pulse generator circuit 21 will be described with reference to FIG. 6. When the load command LDS from the processor 1 is applied to the circuit 21, the first through fourth bits "0, 1, 1, 0" of the phase shifting data FB, which is equal, for example, to the binary-coded decimal number F6 from the processor 1, are set in the first counter 301, while the fifth through eighth bits "1, 1, 1, 1" of the data FB are set in the second counter. When the first and second counters 301 and 302 count 10 clock pulses CLK, the pulses are applied to the clock terminal CL of the FF circuit 303 through the overflow terminal OVF of the second counter 302, causing the Q output of the FF circuit 303 to be switched from the low level to the high level. When the high-level Q output is applied to the OR circuit 304, the application of the clock pulse CLK to the first counter 301 through the OR circuit 304 is prohibited. From the moment the load command LDS is issued to the moment the application of the clock pulse CLK is prohibited, the phase shifting pulse generator circuit 21 sends out five phase shifting pulses FSP.

Square Wave Output Circuit

Figure 7A:
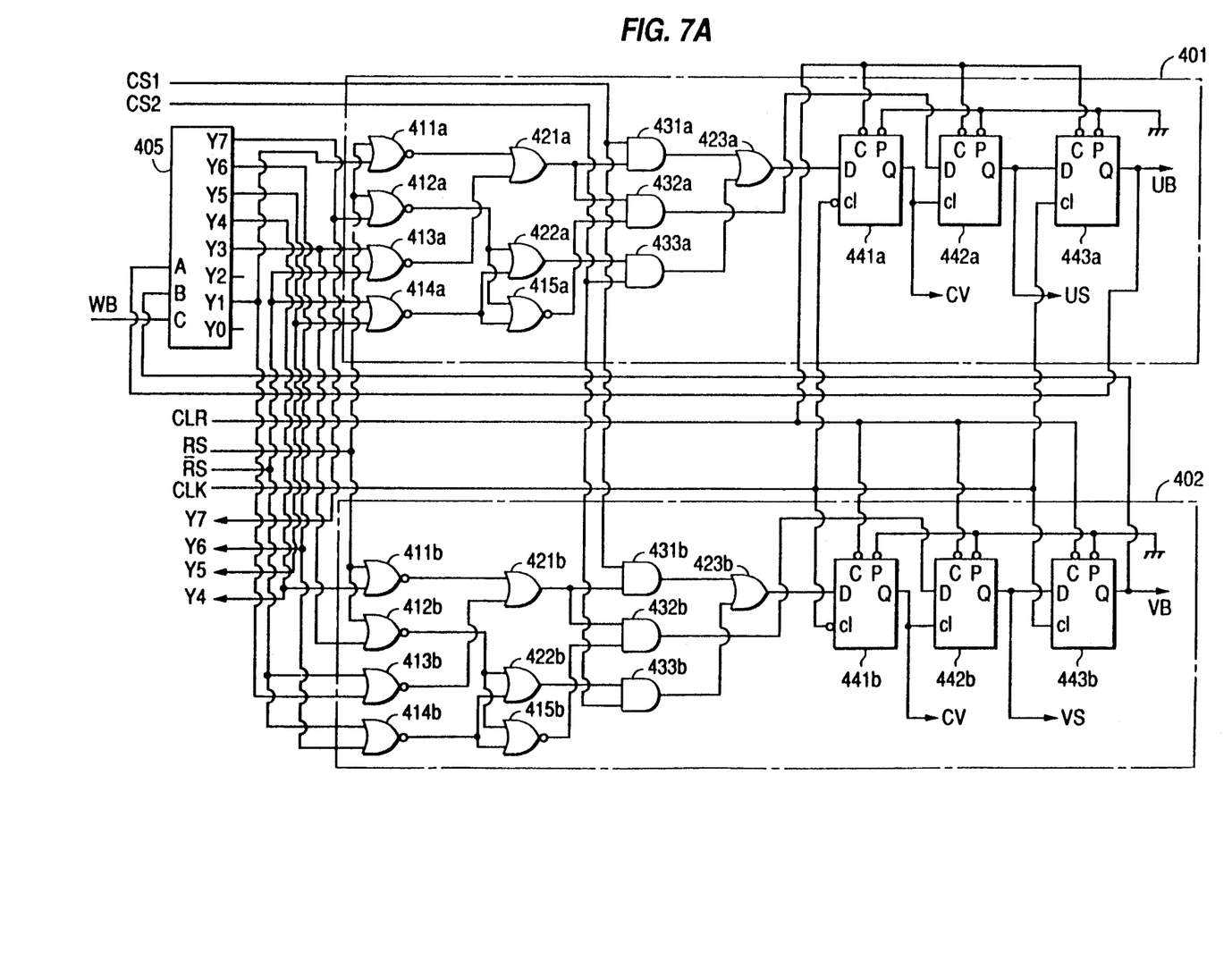
FIG. 7A and FIG. 7B are block diagrams showing a square wave output circuit of FIG. 2.
Figure 7B:
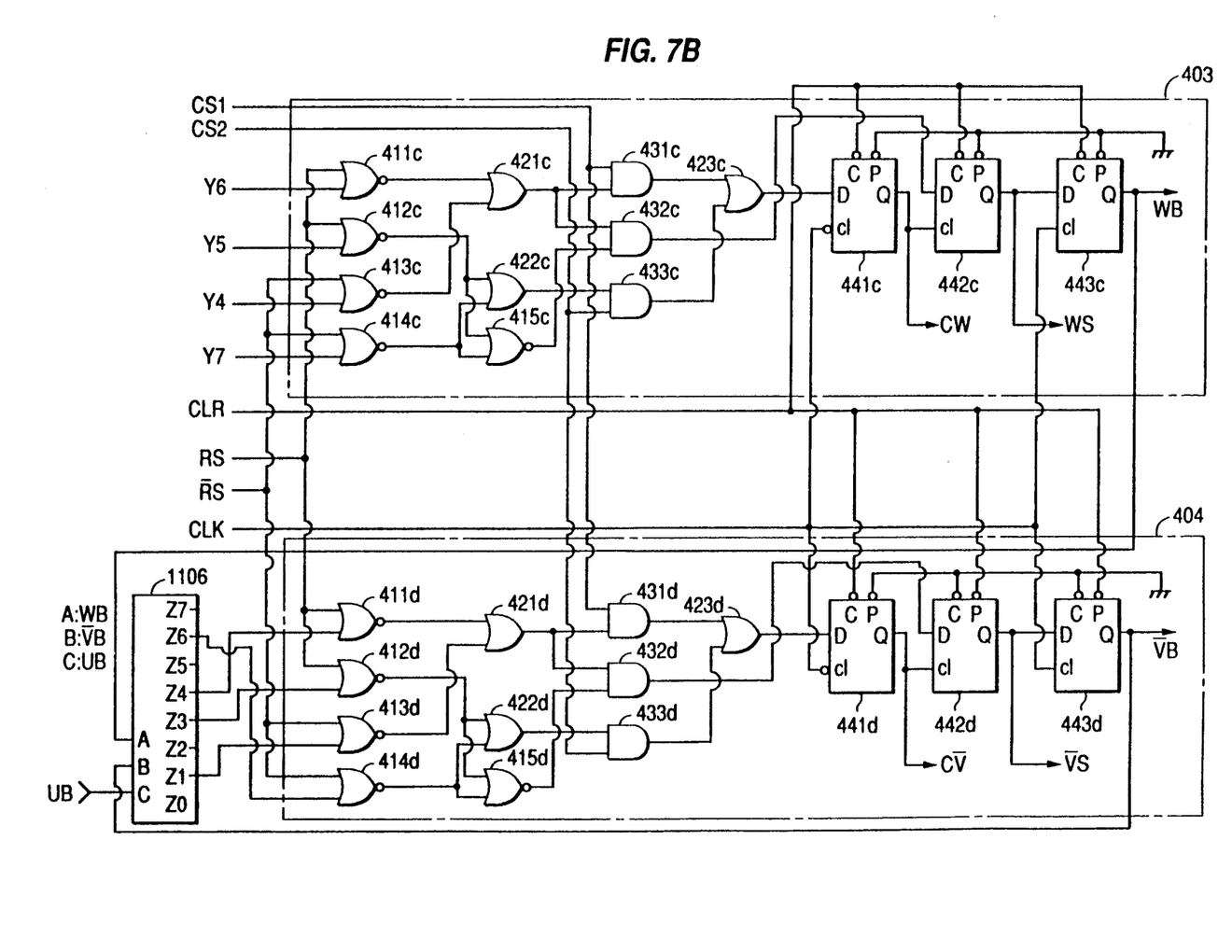

Referring to FIG. 7A and FIG. 7B, the square wave output circuit 26 has the first through third circuit assemblies 401 through 403 for generating square wave signals Us, Vs, and Ws for the phases U, V, and W, respectively, the fourth circuit assembly 404 for generating an antiphase square wave signal $\overline{\text{Vs}}$ for the phase V, and the first and second decoder circuits 405 and 406. The first through fourth circuit assemblies 401 through 404 all have nearly the same configuration. The following mainly describes the first circuit assembly 401, and omits explanation of the corresponding section of the second through fourth circuit assemblies 402 through 404.

The first circuit assembly 401 incorporates the first through fifth nondisjunction (NOR) circuits 411a through 415a, the first through third OR circuits 421a through 423a, the first through third AND circuits 431a through 433a, and the first through third D-type FF circuits 441a through 443a. The second through fourth circuit assemblies 402 through 404 have elements 411b through 443b, 411c through 443c, and 411d through 443d which respectively correspond to the elements 411a through 443a of the first circuit assembly 401. The first decoder circuit 405 has A, B, and C input terminals, which are respectively connected to the Q output terminals of the third FF circuits 443a through 443c of the first through third circuit assemblies in order to receive the Q output signals UB, VB, and WB, and the first through eighth output terminals Y0 through Y7. The first decoder circuit 405 issues the low-level output signal only through the first output terminal when it receives an input signal "000" (when the low-level signal is applied to all the A, B, and C input terminals), and it also issues the low-level signal only through a corresponding output terminal among the second through eighth output terminals when it receives a signal of "001," "010," "011," . . . , "111," thereby decoding the input signals. The second decoder circuit 406 has A, B, and C input terminals, which are respectively connected to the Q output terminals of the third FF circuits 443c, 443d and 443a of the third circuit assembly the fourth circuit assembly and the first circuit assembly in order to receive the Q output signals WB, $\overline{VB}$, and UB, and the first through eighth output terminals Z0 through Z7, thereby providing the same input signal decoding function as that of the first decoder circuit 405.

More specifically, in the first circuit 401, the first and second NOR circuits 411a and 412a have input terminals for receiving the first rotational direction identifying signal $\overline{RS}$, and the other input terminals of the two NOR circuits are respectively connected to the second and eighth output terminals Y1 and Y7 of the first decoder circuit 405. The third and fourth NOR circuits 413a and 414a have input terminals for receiving the second rotational direction identifying signal RS, and other input terminals connected to the fourth and sixth output terminals Y3 and Y5 of the decoder circuit 405. The output terminals of the first and third NOR circuits 411a and 413a are respectively connected to two input terminals of the first OR circuit 421a; the output terminal of the second NOR circuit 412a is connected to one input terminal of the second OR circuit 422a and the fifth NOR circuit 415a; and the output terminal of the fourth NOR circuit 414a is connected to the other input terminal of the circuit 422a and 415a.

Further, the output terminal of the first OR circuit 421a is connected to one input terminal of the first AND circuit 431a, whereas the other input terminal of which is for receiving the first changeover signal CS1, and it is also connected to one input terminal of the second AND circuit 432a, whereas the other input terminal thereof is connected to the output terminal of the fifth NOR circuit 415a. The output terminal of the second OR circuit 422a is connected to one input terminal of the third AND circuit 433a with the other input terminal thereof for receiving the second changeover signal CS2. The output terminals of the first and third AND circuits 431a and 433a are connected to the two input terminals of the third OR circuit 423a.

Further, each of the first through third FF circuits 441a through 443a has a clear terminal C for receiving the clear signal CLR from the processor 1 and a grounded preset terminal P. The first FF circuit 441a has a data input terminal D connected to the output terminal of the third AND circuit 423a, a clock terminal c1 for receiving a clock signal CLK from the processor 1, and a Q output terminal connected to the clock terminal c1 of the second FF circuit 442a. The data input terminal D of the second FF circuit 442a is connected to the output terminal of the second AND circuit 432a. The third FF circuit 443a further has a clock terminal c1 for receiving the clock signal CLK and a data input terminal D connected to the Q output terminal of the second FF circuit 442a.

The relationship of connection among the elements 411b through 443b in the second circuit assembly 402, the relationship of connection among the elements 411c through 443c in the third circuit assembly, and the relationship of connection among the elements 411d through 443d in the fourth circuit assembly 404 are the same as the relationship of connection among the elements 411a through 443a in the first circuit assembly 401. However, the second and third FF circuits 442c, 443c, 442d, and 443d of the third and fourth circuit assemblies 403 and 404, are respectively designed to receive the clear signal CLR via the preset terminal P, and the clear terminals C are grounded. Also, unlike the first circuit assembly 401 wherein one input terminal of each of the first through fourth NOR circuits 411a through 414a is connected to the appropriate one of second, eighth, fourth, and sixth output terminals Y1, Y7, Y3, and Y5 of the first decoder circuit 405 respectively, one input terminal of each of the first through fourth NOR circuits 411b through 414b of the second circuit assembly 402 is connected to appropriate one or the fifth, fourth, second, and seventh output terminals Y4, Y3, Y1, and Y6 of the first decoder circuit 405. One input terminal of each of the first through fourth NOR circuits 411c through 414c of the third circuit assembly 403 is connected to appropriate one of the seventh, sixth, fifth, and eighth output terminals Y6, Y5, Y4, and Y7. Further, one input terminal of each of the first through fourth NOR circuits 411d through 414d of the fourth circuit assembly 404 is connected to appropriate one of the fifth, fourth, second, and seventh output terminals Z4, Z3, Z1, and Z6 respectively of the second decoder circuit 406.

The following describes the operation of the square wave output circuit 26.

When the power is turned ON, the clear signal CLR from the spindle amplifier processor 1 is applied to the clear terminals of the first through third FF circuits 441a through 443a and 441b through 443b of the first and second circuit assemblies 401 and 402, the clear terminals of the first FF circuits 441c and 441d of the third and fourth circuit assemblies 403 and 404, and the preset terminals P of the second and third FF circuits 442c, 443c, 442d, and 443d of the third and fourth circuit assemblies. As a result, the Q outputs CU, US, and UB of the first through third FF circuits 441a through 443a of the first circuit assembly change to the low level (="0"), and the Q outputs CV, VS, and VB of the first through third FF circuits 441b through 443b of the second circuit assembly become "0." Further, the Q outputs CW and $\overline{CV}$ of the first FF circuits 441c and 441d of the third and fourth circuit assemblies become "0," and the Q outputs WS, WB, VS, and VB of the second and third FF circuits 442c, 443c, 442d, and 443d of the third and fourth circuit assemblies become "1." Accordingly, the signals "001" and "110" are applied to the A, B, and C input terminals of the first and second decoder circuits 405 and 406, and the low-level output "0" is issued only through the second output terminal Y1 of the first decoder circuit and the seventh output terminal Z6 of the second decoder circuit, while the high-level output "1" is issued through other output terminals.

When the motor 4 is running in the forward direction, during which the first and second rotational direction identifying signals RS and $\overline{RS}$ are "0" and "1," respectively, if only the outputs Y1 and Z6 out of the outputs of the first and second decoder circuit change to the low level "0," only the first NOR circuit 411a of the first circuit assembly out of the first through fourth NOR circuits of the first through fourth circuit assemblies issues the high-level output "1." For this reason, in the first circuit assembly 401, the high-level output of the first NOR circuit 411a is applied to the data input terminal D of the second FF circuit 442a via the first OR circuit 421a and the second AND circuit 432a whose gate has been opened due to the high-level output from the fifth NOR circuit 415a. On the other hand, the low-level output from the second AND circuits 432b through 432d is applied to the data input terminals D of the second FF circuits 442b through 442d of the second through fourth circuit assemblies.

Figure 8:
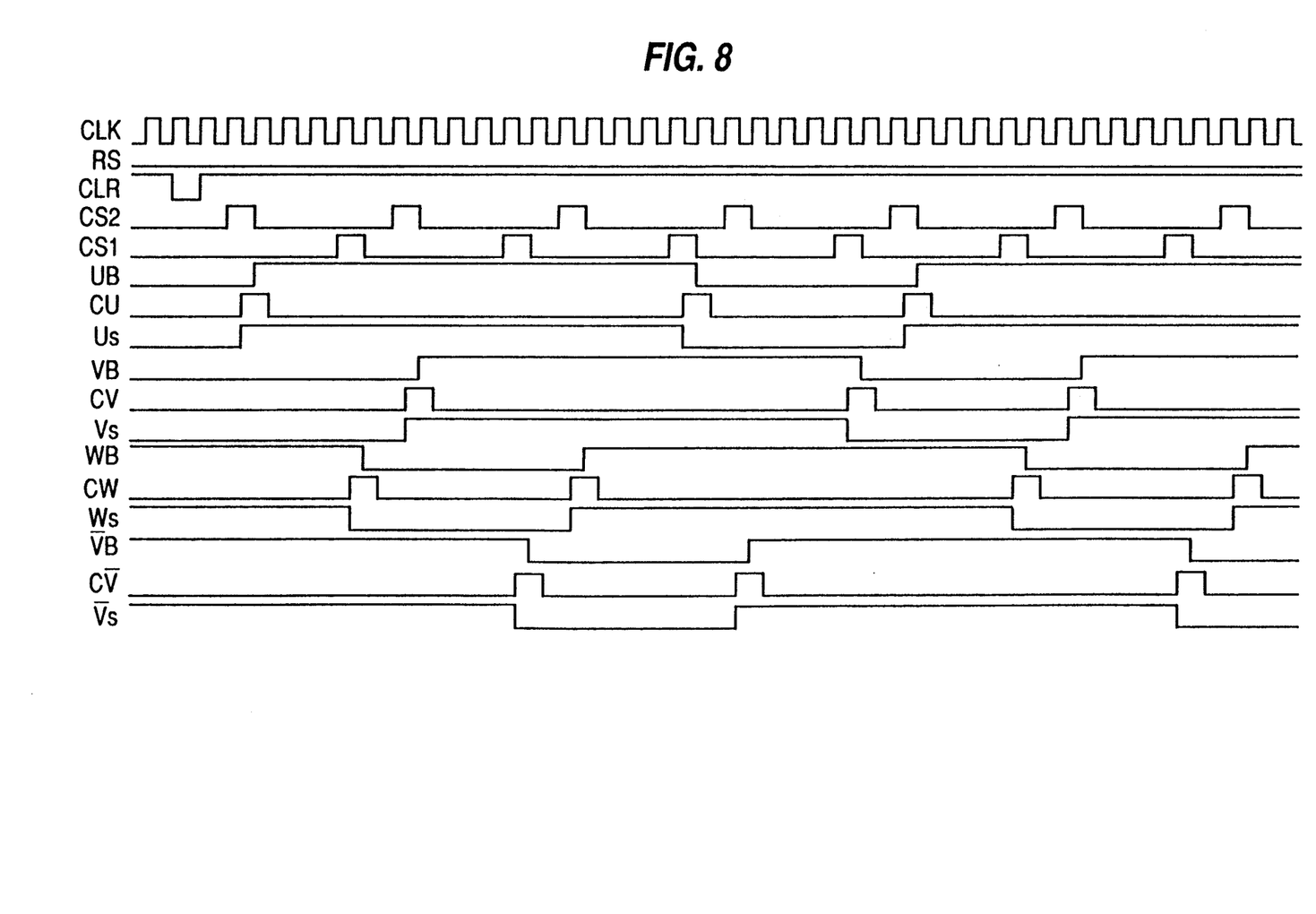
FIG. 8 is a timing chart showing the operation of the square wave output circuit with the motor running in the forward direction.

Next, when the first changeover signal CS1 switches to "1," in the first circuit assembly 401, the high-level output of the first NOR circuit 411a is applied to the data input terminal D of the first FF circuit 441a via the first OR circuit 421a and the first AND circuit 431a whose gate has been opened due to the first changeover signal CS1. On the other hand, the low-level output from the first AND circuits 431b through 431d is applied to the data input terminals D of the first FF circuits 441b through 441d of the second through fourth circuit assemblies. Then, when the clock signal CLK falls, the Q output CU of the first FF circuit 441a of the first circuit assembly switches from the low to high level, causing the Q output US of the second FF circuit 442a to switch from the low to high level as shown in FIG. 8. Further, when the clock signal CLK rises next, the level of the Q output UB of the third FF circuit 443a switches to "1." On the other hand, the Q outputs CV, CW, and $\overline{CV}$ of the first FF circuits 441b through 441d of the second through fourth circuit assemblies, the Q outputs VS, WS, and $\overline{VS}$ of the second FF circuits 442b through 442d, and the Q outputs VB, WB, and $\overline{VB}$ of the third FF circuits 443b through 443d are all maintained at the low level.

As described above, as a result of the level switching of the output UB of the first circuit assembly, the input signals "101" and "111" are applied to the first and second decoder circuit assemblies 405 and 406. Consequently, only the outputs Y5 and Z7 out of the first and second decoder circuit outputs change to the low level "0," and only the second NOR circuit 412c of the third circuit assembly out of the first through fourth NOR circuits of the first through fourth circuit assemblies issues the high-level output "1." Further, the output of the first NOR circuit 411a of the first circuit assembly switches to the low level, and this low-level output is applied to the data input terminal D of the first FF circuit 441a via the first OR circuit 421a, the first AND circuit 431a, and the third OR circuit 423a. Therefore, when the clock signal CLK falls, the Q output CU of the first FF circuit 441a switches to the "0" level.

Next, when the second changeover signal CS2 is generated, the gates of the third AND circuits 433a through 433d of the first through fourth circuit assemblies are opened, causing the high-level output from the second NOR circuit 412c of the third circuit assembly to be applied to the data input terminal D of the first FF circuit 441c via the second OR circuit 422c, the third AND circuit 433c, and the third OR circuit 423c. When the clock signal CLK falls, the level of the Q output CW of the first FF circuit 441c changes to "1", and this rise of the Q output causes the level of the Q output WS of the second FF circuit 442c to be changed to "0", where the low-level output has been applied to the data input terminal of the circuit. Further, when the subsequent clock signal CLK rises, the Q output WB of the third FF circuit 433c changes to the "0" level.

As described above, when the input signals "100" and "011" are applied to the first and second decoder circuit assemblies 405 and 406 as a result of the level changeover of the output WB of the third circuit assembly, only the outputs Y4 and Z3 out of the first and second decoder circuit outputs change to the low level "0," and therefore, only the first NOR circuit 411b of the second circuit assembly and the second NOR circuit 412d of the fourth circuit assembly out of the first through fourth NOR circuits of the first through fourth circuit assemblies generate the high-level output. At that time, the gate of the second AND circuit 432d corresponding to the circuit 412d is in a closed state, and therefore, the output level of the AND circuit 432d is not reversed. On the other hand, the high-level output of the first NOR circuit 411b is applied to the data input terminal D of the second FF circuit 442b via the first OR circuit 421b and the second AND circuit 432b, and also to the first AND circuit 431b via the first OR circuit 421b.

Under such condition, when the first changeover signal CS1 is generated, causing the gate of the first AND circuit 431b to open, the high-level output of the first NOR circuit 411b is applied to the data input terminal D of the first FF circuit 441b via the first AND circuit 431b and the third OR circuit 423b. When the clock signal CLK falls, the level of the Q output CV of the first FF circuit 441b changes to "1," and when the Q output rises, the Q output VS of the second FF circuit 442b changes to the level "1". Further, another rise of the clock signal CLK causes the Q output VB of the third FF circuit 443b to switch to the level "1."

As described above, when the input signals "110," and "011" are applied to the first and second decoder circuit assemblies 405 and 406 as a result of the level changeover of the output VB of the second circuit assembly, the decoder circuit outputs Y6 and Z3 switch to the low level, and the first NOR circuit 411c of the third circuit assembly and the second NOR circuit 412d of the fourth circuit assembly generate the high-level output. When the second changeover signal CS2 is generated, the high-level output of the NOR circuit 412d is applied to the data input terminal D of the first FF circuit 441d via the second OR circuit 422d, the third AND circuit 433d, whose gate has been opened by the signal CS2, and the third OR circuit 423d. Accordingly, when the clock signal CLK falls, the Q output CV of the first FF circuit 441d changes to the level "1". When the Q output rises, the Q output VS of the second FF circuit 442d changes to "0" level, where the data input terminal D thereof has been subjected to the application of the low-level output of the second AND circuit 432d. When the clock signal CLK rises next, the Q output $\overline{V}B$ of the third FF circuit 443d switches to the "0" level.

When the input signals "110" and "001" are applied to the first and second decoder circuit assemblies 405 and 406 because of the level reversion of the fourth circuit assembly output VB, causing the decoder circuit outputs Y6 and Z1 to switch to the low level, the first NOR circuit 411c of the third circuit assembly generates the high-level output which is applied to the data input terminal D of the second FF circuit 442c via the first OR circuit 421c and the second AND circuit 432c whose gate is open. Then, when the first changeover signal CS1 is generated, the high-level output of the NOR circuit 411c is applied to the data input terminal D of the first FF circuit 441c via the first OR circuit 421c, the first AND circuit 431c, the gate thereof has been opened by the signal CS1, and the third OR circuit 423c. When the clock signal CLK falls, the Q output CW of the first FF circuit 441c switches to the "1" level. The rise of this Q output causes the Q output WS of the second FF circuit 442c to change to the "1" level. Another rise of the clock signal CLK causes the Q output WB of the third FF circuit 443c to switch to the "1" level.

When the input signals "111" and "101" are applied to the first and second decoder circuit assemblies 405 and 406 following the level reversion of the third circuit assembly output WB to cause the decoder circuit outputs Y7 and Z5 to switch to the low level, the second NOR circuit 412a of the first circuit assembly generates the high-level output, which is applied to the third AND circuit 433a via the second OR circuit 422a. When the second changeover signal CS2 is generated, the high-level output of the second NOR circuit 412a is applied to the data input terminal D of the first FF circuit 441a via the second OR circuit 422a, the third AND circuit 433a, the gate of which has been opened by the signal CS2, and the third OR circuit 423a. When the clock signal CLK falls, the Q output CU of the first FF circuit 441a switches to the "1" level. The rise of this Q output causes the Q output US of the second FF circuit 442a to change to the "0" level. Another rise of the clock signal CLK causes the Q output UB of the third FF circuit 443a to switch to the "0" level.

When the input signals "011" and "100" are applied to the first and second decoder circuit assemblies 405 and 406 as the result of the level reversion of the first circuit assembly output UB to cause the decoder circuit outputs Y3 and Z4 to switch to the low level, the second NOR circuit 412b of the second circuit assembly and the first NOR circuit 411d of the fourth circuit assembly generate the high-level output. When the first changeover signal CS1 is generated, the high-level output of the NOR circuit 411d is applied to the data input terminal D of the first FF circuit 441d via the first OR circuit 421d, the first AND circuit 431d, the gate of which has been opened by the signal CS1, and the third OR circuit 423d. When the clock signal CLK falls, the Q output CV of the first FF circuit 441d switches to the "1" level. The rise of this Q output causes the Q output VS of the second FF circuit 442d to change to the "1" level. Another rise of the clock signal CLK causes the Q output VB of the third FF circuit 443d to switch to the "1" level.

When the input signals "011" and "110" are applied to the first and second decoder circuit assemblies 405 and 406 because of the level reversion of the fourth circuit assembly output $\overline{V}B$ to cause the decoder circuit outputs Y3 and Z6 to switch to the low level, the second NOR circuit 412b of the second circuit assembly and the fourth NOR circuit 414d of the fourth circuit assembly generate the high-level output. When the second changeover signal CS2 is generated, the high-level output of the NOR circuit 412b is applied to the data input terminal D of the first FF circuit 441b via the second OR circuit 422b, the third AND circuit 433b, the gate of which has been opened by the signal CS2, and the third OR circuit 423b. When the clock signal CLK falls, the Q output CV of the first FF circuit 441b switches to the "1" level. The rise of this Q output causes the Q output VS of the second FF circuit 442d to change to the "0" level. Another rise of the clock signal CLK causes the Q output VB of the third FF circuit 443b to switch to the "0" level. As a result of the level changeover of the second circuit assembly output VB, the input signals to be applied to the first and second decoder circuit assemblies 405 and 406 become identical with the original input signals "001" and "110."

Figure 9:
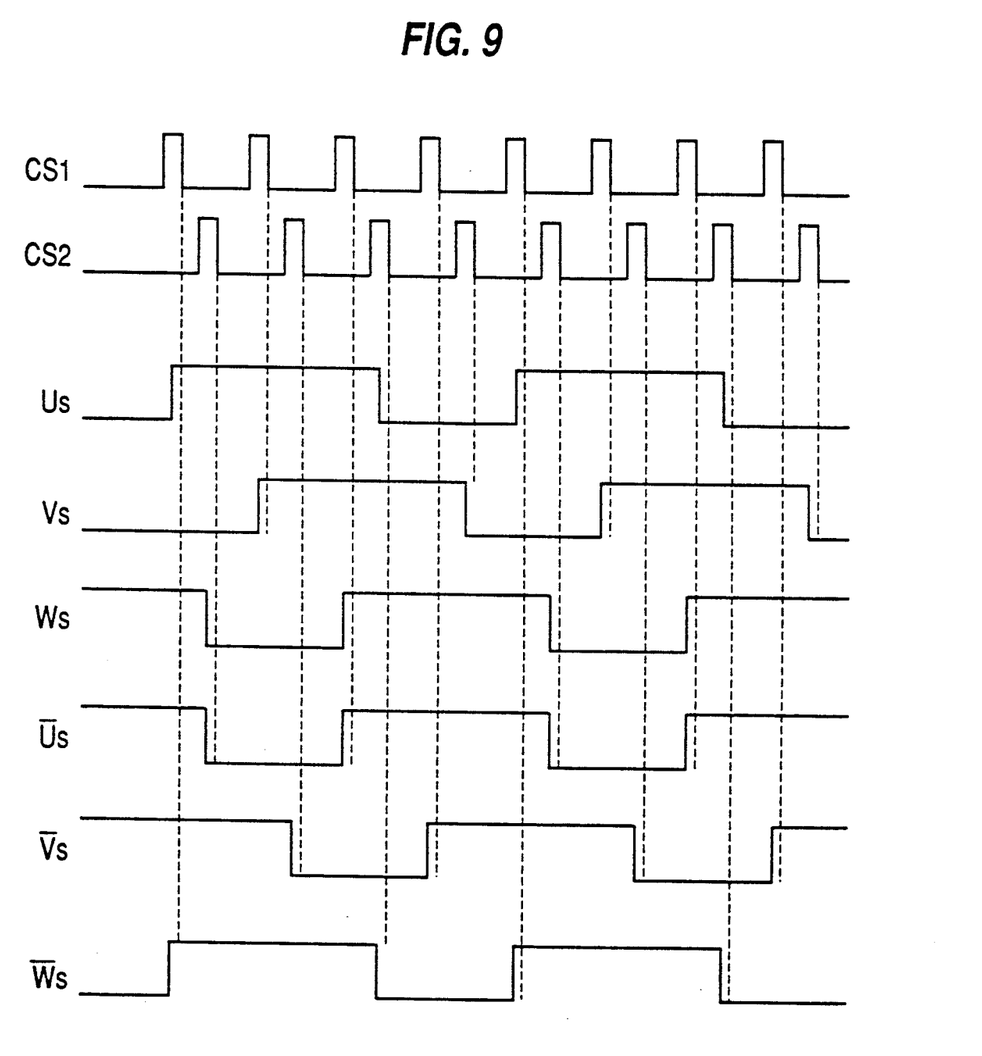
FIG. 9 is a timing chart showing a square wave signal sent out from the square wave output circuit with the motor running in the forward direction.
Figure 10:
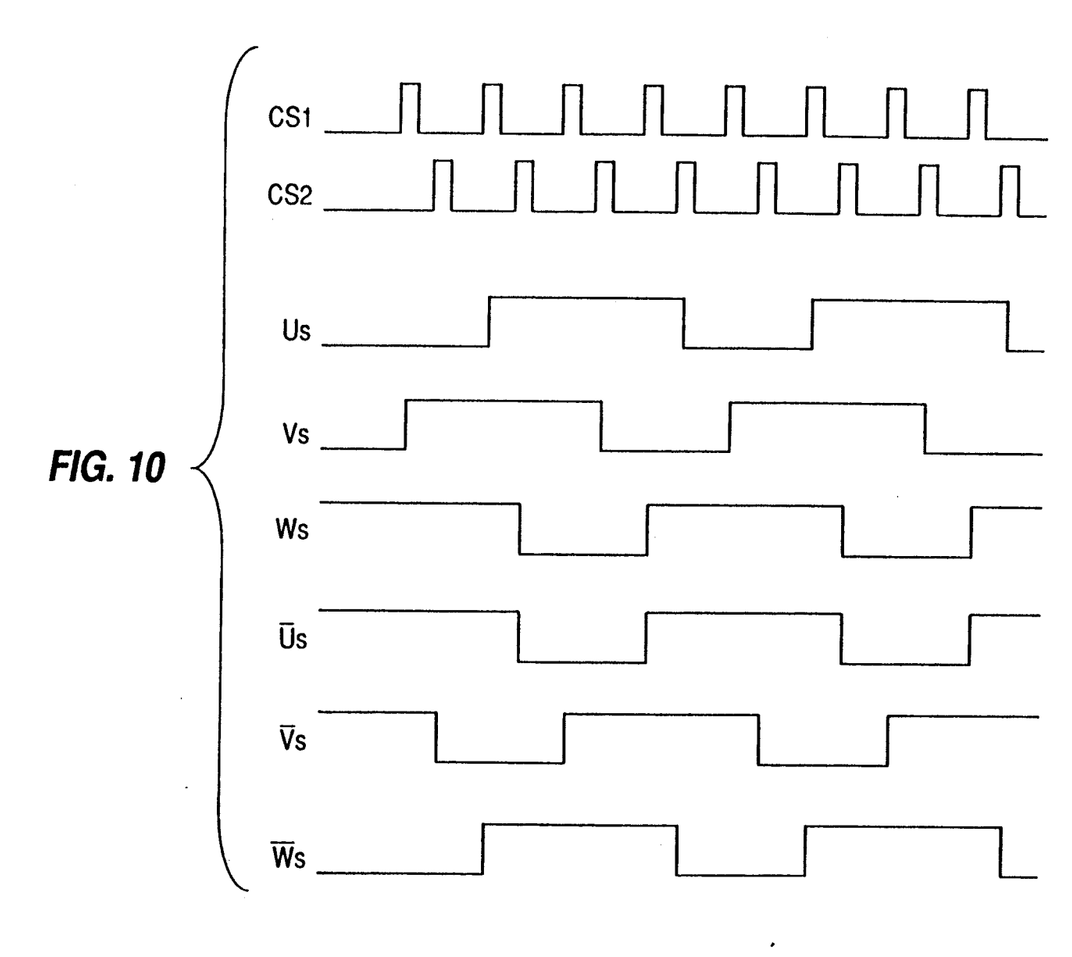
FIG. 10 is a timing chart showing a square wave signal sent out from the square wave output circuit with the motor running in the reverse direction.

After that, a series of the operation steps described above is repeated. As a result, while the motor 4 is running in the forward direction, the square wave signals Us, Vs, Ws, and $\overline{V}s$, which switch between the high and low levels in accordance with the first and second changeover signals CS1 and CS2, are sent out from the square wave output circuit 26 as shown in FIG. 9. The antiphase square wave signals $\overline{U}s$ and $\overline{W}s$ of the U phase and the W phase are equal to the square wave signals Ws and Us of the W phase and the U phase respectively. FIG. 10 shows the square wave signals sent out from the circuit 26 while the motor is running in the reverse direction.

Drive Signal Generator Circuit

Figure 11:
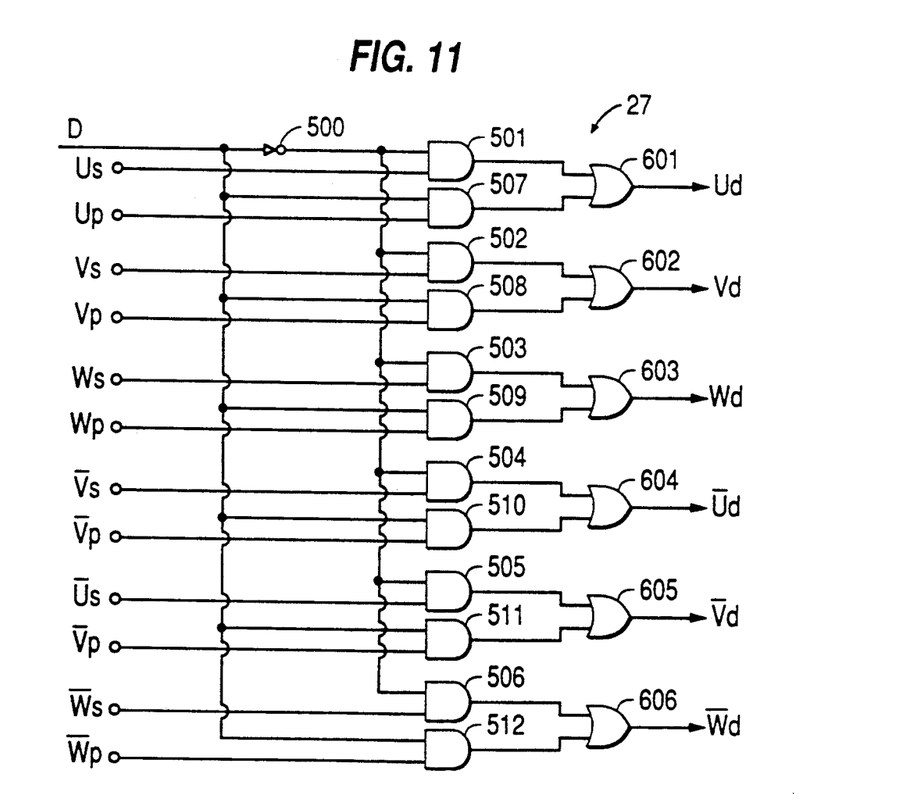
FIG. 11 is a block diagram showing a drive signal generator circuit of FIG. 2.

Referring to FIG. 11, the drive signal generator circuit 27 comprises an inverter 500, the first through 12th AND circuits 501 through 512, and the first through sixth OR circuits 601 through 606. Each of the first through sixth AND circuits 501 through 506 has the first input terminal connected to the input side of the inverter 500, the second input terminal connected to a corresponding square wave signal output terminal of the square wave output circuit 26, and an output terminal connected to a corresponding first input terminal of the first through sixth OR circuits 601 through 606. On the other hand, each of the seventh through 12th AND circuits 507 through 512 has the first input terminal connected to the output side of the inverter 500, the second input terminal connected to a corresponding PWM signal output terminal of the processor 1, and an output terminal connected to a corresponding second input terminal of the first through sixth OR circuits 601 through 606.

Thus, the drive signal generator circuit 27 is designed to output the square wave signals Us, Vs, Ws, $\overline{U}s$, $\overline{V}s$, and $\overline{W}s$ as the drive signals Ud, Vd, $\overline{U}d$, $\overline{V}d$, and $\overline{W}d$ via the AND circuits 501 through 506 and the OR circuits 601 through 606 when the selector signal D is at the low level, while it issues the PWM signals Up, Vp, Wp, $\overline{U}p$, $\overline{V}p$, and $\overline{W}p$ as the drive signals via the AND circuits 507 through 512 and the OR circuits 601 through 606 when the selector signal D is at the high level.

Operation of the Driving System

When the power is turned ON, the spindle amplifier processor 1 sets the selector signal D to the high level "1," selects the driving method based on the PWM signals, and sends out the clear signal CLR to initialize the square wave output circuit 26 (Us=0, Vs=0, Ws=1, $\overline{\text{Vs}}$=1). The processor 1 performs the speed loop control and current control in accordance with the speed command received from the host control unit, the speed feedback signal issued from the speed detector 5 via the converter 8, and the current feedback signal received from the current detectors 6 and 7, calculates the three-phase PWM signals Up, Vp, Wp, $\overline{\text{U}}$p, $\overline{\text{V}}$p, and $\overline{\text{W}}$p, and supplies the PWM signals to the drive signal generator circuit 27. Further, the processor 1 calculates the slip pulse data SB and the phase shifting pulse data FB according to the speed command and a speed deviation, and sends the calculation results to the slip pulse generator circuit 20 and the phase shifting pulse generator circuit 21 respectively. The selector signal D is "1," and therefore, the drive signal generator circuit 27 supplies the PWM signals Up, Vp, Wp, $\overline{\text{U}}$p, $\overline{\text{V}}$p, and $\overline{\text{W}}$p to the power circuit 3 as the drive signals Ud, Vd, Wd, $\overline{\text{U}}$d, $\overline{\text{V}}$d, and $\overline{\text{W}}$d. The induction motor 4 is driven by the inverter of the power circuit 3 which operates in response to the drive signals.

When the slip pulse generator circuit 20 receives the slip pulse data SB from the processor 1, it produces the slip pulse SSP as described previously with reference to FIG. 3 and FIG. 4. When the phase shifting pulse generator circuit 21 receives the phase shifting pulse data FB from the processor 1, it produces the phase shifting pulse FSP as described above with reference to FIG. 5 and FIG. 6. Both pulses SSP and FSP are applied to the pulse overlapping circuit 23 via the OR circuit 22. The circuit 23 detects the rotational direction of the motor 4 in accordance with the A-phase and B-phase signals received from the converting circuit 8, produces the first and second rotational direction identifying signals RS and $\overline{\text{RS}}$, and also generates a forward/reverse feedback pulse according to the A-phase and B-phase signals. Further, the pulse overlapping circuit 23 sends a forward/reverse pulse, which is obtained by adding or subtracting the slip pulse SSP and the phase shifting pulse FSP to or from the forward/reverse feedback pulse, to the counter 24. The counter 24 produces the first changeover signal CS1 each time it counts the specified number of pulses from the circuit 23. The delay circuit 25 generates the second changeover signal CS2 which is delayed from the first changeover signal by the specified time.

When the square wave output circuit 26 receives the first and second rotational direction identifying signals RS, $\overline{\text{RS}}$, and the first and second changeover signals CS1 and CS2, it generates the phase square wave signals Us, Vs, Ws, $\overline{\text{U}}$s, $\overline{\text{V}}$s, and $\overline{\text{W}}$s in accordance with the rotational direction of the motor as described above with reference to FIG. 7A, FIG. 7B, and FIG. 8 through FIG. 10. However, as long as the selector signal is "1," the drive signal generator circuit 27 does not send the square wave signals as the drive signals. Accordingly, the motor 4 is driven in accordance with the PWM signals.

After that, when the revolution speed of the motor 4 exceeds a preset speed, the processor 1 changes the selector signal D from the high level "1" to the low level "0." As a result, the square wave signals Us, Vs, Ws, $\overline{\text{U}}$s, $\overline{\text{V}}$s, and $\overline{\text{W}}$s generated by the square wave output circuits 26 are supplied as the drive signals Ud, Vd, Wd, $\overline{\text{U}}$d, $\overline{\text{V}}$d, and $\overline{\text{W}}$d, to the power circuit 3 from the drive signal generator 27. Thus, the motor 4 is driven and controlled in accordance with the square wave signals.

What is claimed is:

1. A driving system for an induction motor which comprises:
   an inverter incorporating switching devices related to the individual phases of the motor;
   a detector for generating pulse outputs indicating actual revolution speeds of the motor; and
   circuit means for generating a slip pulse and phase shifting pulse in accordance with a speed command from a host control unit and an output pulse from the detector, for correcting the number of the output pulses by using the slip pulse and the phase shifting pulse, and for generating a square wave signal used for controlling the switching operating of the switching devices in accordance with the corrected output pulses.

2. The driving system according to claim 1, wherein the circuit means has means for producing PWM signals used for controlling the switching operation of the switching devices, and selector circuit means for selectively sending either the square wave signal or the PWM signal.

3. The driving system according to claim 2, wherein the selector circuit means issues the PWM signal when the revolution speed of the motor is a specified speed or less, and wherein the selector circuit means sends out the square wave signal when the revolution speed of the motor exceeds the specified speed.

4. The driving system according to claim 1, wherein the circuit means corrects the number of the output pulses by using the phase shifting pulse so that an exciting current for each phase of the motor and the secondary current, which are generated as a result of a switching operation of the switching devices in response to the square wave signal produced in accordance with the corrected output pulses, intersect with each other orthogonally.

* * * * *